United States Patent
Hayashida et al.

(10) Patent No.: US 7,321,231 B2
(45) Date of Patent: Jan. 22, 2008

(54) MEASUREMENT INSTRUMENT

(75) Inventors: Shuuji Hayashida, Kawasaki (JP); Shozaburo Tsuji, Kawasaki (JP); Yuji Fujikawa, Kure (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/487,427

(22) Filed: Jul. 17, 2006

(65) Prior Publication Data

US 2007/0018658 A1 Jan. 25, 2007

(30) Foreign Application Priority Data

Jul. 22, 2005 (JP) .............................. 2005-213298

(51) Int. Cl.
G01R 27/26 (2006.01)
G01B 3/18 (2006.01)

(52) U.S. Cl. ........................... 324/662; 324/66; 33/813
(58) Field of Classification Search ................ 324/662, 324/66
See application file for complete search history.

(56) References Cited

U.S. PATENT DOCUMENTS 5,920,198 A * 7/1999 Suzuki et al. ............... 324/662
6,463,671 B1 10/2002 Saeki
7,013,576 B2 3/2006 Hayashida et al.
7,043,852 B2 5/2006 Hayashida et al.
2003/0135347 A1* 7/2003 Sasaki ........................ 702/150
2004/0118004 A1* 6/2004 Hayashida et al. ........... 33/815

FOREIGN PATENT DOCUMENTS

| JP | U-49-080260 | 10/1972 |
| JP | A-54-130152 | 10/1979 |
| JP | A-2001-141402 | 5/2001 |
| JP | A-2003-202201 | 7/2003 |

* cited by examiner

Primary Examiner—Andrew H. Hirshfeld
Assistant Examiner—John Zhu
(74) Attorney, Agent, or Firm—Oliff & Berridge, PLC

(57) ABSTRACT

A measuring instrument has a phase signal transmitter that transmits, in accordance with a rotation of the spindle, a phase signal that differs corresponding to the rotation angle of the spindle, and an arithmetic processor that arithmetically processes the phase signal to obtain the absolute position of the spindle. The phase signal transmitter transmits the phase signal at a predetermined pitch. Since the phase signal differs corresponding to the rotation angle of the spindle, a rotation angle of the spindle is uniquely determined by the phase signal. Unlike an increment type measuring instrument, since there is no concern that the signal will be skip-read, the spindle can be rotated at high speed, so that operational performance of the micrometer can be improved. Further, since there is no concern that the signal will be skip-read, the phase signal can be minutely varied with respect to the rotation of the spindle.

7 Claims, 10 Drawing Sheets

MEASUREMENT INSTRUMENT

BACKGROUND OF THE INVENTION

1. Field of the Invention

The present invention relates to a measuring instrument. More specifically, the present invention relates to a measuring instrument for measuring dimensions of a workpiece by advancing/retreating a spindle thereof, the measuring instrument being typified, for instance, by a micrometer and a micrometer head.

2. Description of Related Art

Conventionally, a measuring instrument, such as a micrometer or a micrometer head, used for measuring dimensions of a workpiece by advancing/retreating a spindle in accordance with its screwing rotation has been known (refer to, for instance, Document 1: Japanese Utility Model Laid-Open No. S49-80260, and Document 2: Japanese Patent Laid-Open Publication No. S54-130152).

Such a measuring instrument includes a main body having a female thread, a spindle having a lead screw engaged with the female thread of the main body, a rotation detector which detects a rotation of the spindle, and an arithmetic processor which obtains a displacement of the spindle based on a signal output from the rotation detector.

In such a measuring instrument, the displacement per one rotation of the spindle is defined by a screw pitch of the lead screw formed on the spindle, the screw pitch of the lead screw generally being 0.5 mm, for instance.

The rotation detector includes, for instance, a rotor which rotates together with the spindle, a stator fixed on the main body in a state of being opposed to the rotor, and a phase calculator which increments a signal output from the stator corresponding to the rotation of the rotor to calculate a rotational phase of the rotor.

FIG. 11A and FIG. 11B show confronted surfaces of a rotor 1 and a stator 2.

As shown in FIG. 11A, the stator 2 includes a transmitting terminal 21 which has a plurality of electrode plates arranged at equal angular interval on a predetermined circumference on a surface opposing to the rotor 1, and a ring-shaped receiving terminal 22 arranged concentrically to the transmitting terminal 21. An AC signal whose phase is modulated is transmitted from a pulse modulator to each electrode plate of the transmitting terminal 21. The transmitting terminal 21 includes sixteen electrode plates, to which AC signals are respectively applied, the phases of the AC signals being different by 45 degrees with each other. As shown in FIG. 11B, the rotor 1 includes a coupled terminal 11 which straddles the transmitting terminal 21 and the receiving terminal 22 of the stator 2 on a surface opposing to the stator 2. The coupled terminal 11 is electrostatically coupled with a predetermined number of electrode plates among the electrode plates of the transmitting terminal 21.

With such a configuration, when the spindle is rotated, the spindle is advanced and retreated along with screwing rotation of the spindle against the main body. The rotation of the spindle at this time is detected by the rotation detector. In other words, when the spindle rotates, the rotor 1 rotates together with the spindle.

Further, when the predetermined AC signal is transmitted to respective electrode plates of the transmitting terminal 21, the potential is transmitted in an order of: transmitting terminal 21 to coupled terminal 11 to receiving terminal 22. Since the electrode plates of transmitting terminal 21 electrostatically coupled with the coupled electrode 11 change when the rotor 1 is being rotated, the potential of the receiving terminal 22 electrostatically coupled with coupled terminal 11 will change too. A rotational phase of the rotor can be obtained by sampling the potential of the receiving terminal 22 at a predetermined sampling pitch to obtain pulse signals and count the obtained pulse signals by a phase calculator.

Since the rotational phase of the rotor 1 equals to a rotational phase of the spindle, the displacement of the spindle can be calculated by the arithmetic processor based on the rotational phase of the spindle and the pitch (0.5 mm, for instance) of the lead screw.

However, in the case where the screw pitch of the male screw formed on the spindle is 0.5 mm or 0.635 mm, since the displacement per one rotation of the spindle is small, the spindle has to be rotated for many times every time an object to be measured is changed, which raises a problem in operational performance.

A method to increase the displacement of the spindle per one rotation is, for instance, to increase the pitch of the lead screw up to 1 mm to 2 mm so as to increase an advancing/retreating amount per one rotation of the spindle.

By increasing the pitch of the lead screw up to 1 mm to 2 mm, since the advancing/retreating amount of the spindle per one rotation is increased, there will be no doubt that the operational performance can be improved due to increased displacing speed of the spindle.

However, when the pitch of the lead screw is increased, detection accuracy and detection resolution of the rotation detector have to be improved correspondently. For instance, when the pitch of the lead screw is increased by 4 times, if the detection resolution for the phase remains unchanged, the detection resolution for the displacement of the spindle will simply be reduced to ¼.

In order to increase the detection resolution per one rotation of the spindle, a feasible method is to reduce sizes of the electrode plates of the transmitting terminal 21 to increase the number of the electrode plates, so that minute change of the rotation angle of the rotor 1 can be detected. However, when the number of the electrode plates of the transmitting terminal 21 is increased, since the electrode plates of the transmitting terminal 21 electrostatically coupled with the coupled terminal 11 vary when the rotor 1 is rotated by minute angle, variation period of the potential of the receiving terminal 22 becomes short.

Thus detection errors such as skip-read of the pulse signal will frequently occur in the phase calculator, which will cause a problem that angle variation of the rotor 1 can not be accurately caught up.

A feasible solution to the problem is to shorten a sampling period at which the potential of the receiving terminal 22 is sampled, however the room for shortening the sampling period is limited depending on a speed of an IC and the like. Further, if the sampling period is shortened, since the pulse signal becomes easily affected by disturbance such as noise, detection accuracy will unexpectedly decrease due to electric disturbance from outside. Further, if the sampling period is shortened, power consumption will increase, so that the battery service life will be reduced.

Since it could not be achieved to detect the displacement of the spindle at high accuracy and high resolution with a spindle having a high lead screw, it is desirable to provide a measuring instrument whose spindle can be displaced at high speed, and therefore has good operational performance as well as high detection accuracy and high detection resolution.

SUMMARY OF THE INVENTION

It is a primary object of the present invention to provide a measuring instrument which has good operational performance, high detection accuracy, and high detection resolution.

The measuring instrument according to an aspect of the present invention includes: a main body; a spindle screwed into the main body and advanceable/retreatable in an axial direction in accordance with its rotation; a phase signal transmitter that transmits a phase signal in accordance with the rotation of the spindle, the phase signal differing corresponding to a rotation angle of the spindle; and an arithmetic processor that arithmetically processes the phase signal to obtain an absolute position of the spindle, in which the phase signal transmitter transmits the phase signal at a predetermined pitch, and in which the arithmetic processor further comprises: a rotation angle calculator that calculates the rotation angle of the spindle based on the phase signal; a rotation number calculator that counts the rotation number of the spindle based on the rotation angle of the spindle calculated by the rotation angle calculator; a total rotational phase calculator that calculates a total rotational phase of the spindle based on the rotation number of the spindle counted by the rotation number calculator and the rotation angle of the spindle calculated by the rotation angle calculator; and a spindle position calculator that calculates the absolute position of the spindle based on the total rotational phase of the spindle calculated by the total rotational phase calculator.

With such a configuration, when the spindle is rotated, the spindle is advanced and retreated relative to the main body due to the engagement between the spindle and the main body. At this time, the phase signal transmitter transmits, in accordance with the rotation of the spindle, the phase signal corresponding to the rotation angle of the rotor. The phase signal differs corresponding to the rotation angle of the spindle. Incidentally, the range of the rotation angle θ is $0° \leq \theta < 360°$, in other words, the phase is within one rotation. The rotation angle of the spindle is uniquely determined by the rotation angle calculator based on the phase signal. Further, since the rotation angle of the spindle is sequentially calculated by the rotation angle calculator, the rotation number of the spindle can be calculated by the rotation number calculator based on the calculated rotation angle. For instance, when the rotation angle of the spindle calculated by the rotation angle calculator changes in the order of 5°, 95°, 185°, 275°, and 365°, since the spindle rotates for one rotation, it is counted by the rotation number calculator 520 that the spindle is rotated for +1 rotation.

The total rotational phase of the spindle is calculated by the total rotational phase calculator based on the rotation number of the spindle calculated by the rotation number calculator and the rotation angle of the spindle calculated by the rotation angle calculator. For instance, in the case where the rotation number of the spindle is two, and the rotation angle is 45°, then the total rotational phase will be 765° (=360°×2 +45°). Further, the absolute position of the spindle is calculated by the spindle position calculator based on the total rotational phase calculated by the total rotational phase calculator. For instance, in the case where an advancing/retreating pitch of the spindle per one rotation is 2 mm and the total rotational phase is 765°, the absolute position of the spindle will be 4.25 mm (=765°÷360°×2 mm).

With such a configuration, since the rotation angle of the spindle is obtained based on the phase signals from the phase signal transmitter, and since the value of the phase signal differs corresponding to the rotation angle of the spindle, the rotation angle of the spindle is uniquely determined by the phase signal. Conventionally, since a rotational phase of a spindle is detected by performing increment of a pulse signal corresponding to the rotation of the spindle, if the pulse signal varies too fast relative to the rotation speed of the spindle, the signal will frequently be skip-read, so that the rotational phase of the spindle can not be accurately detected. This problem can be dealt with by restricting the rotation speed of the spindle or reducing frequency of signal variation per one rotation of the spindle, so that increment can be performed accurately. However, if the rotation speed of the spindle is restricted, the advancing/retreating speed of the spindle is also restricted, so that the operational performance will be degraded. In addition, if the frequency of signal variation per one rotation of the spindle is reduced, there will arise a problem that resolution for the rotation angle will be decreased.

In the present invention, since the rotation angle of the spindle can be uniquely determined by one phase signal transmitted from the phase signal transmitter, it is unnecessary to perform increment of signal as in the conventional art. Thus, in the present invention, since there is no concern that the signal will be skip-read due to high speed rotation of the spindle, the rotation speed of the spindle needs not to be restricted, and therefore operational performance of the measuring instrument can be improved without restricting the rotation speed of the spindle. Thus, the rotation angle of the spindle can be obtained by the phase signal from the phase signal transmitter even when the spindle is rotated in high speed.

Further, since there is no concern that the signal will be skip-read, the phase signal can be minutely varied with respect to the rotation of the spindle.

By minutely varying the phase signal with respect to the rotation of the spindle, resolution for the rotation angle of the spindle can be increased. Further, since it is only necessary for the phase signal transmitter to transmit the signal at a pitch of such a degree that the rotation number of the spindle will not be skip-read by the rotation number calculator, it is unnecessary to perform increment of signal as in the conventional art, and therefore the frequency of transmission can be minimized compared to the conventional increment type which results in lower power consumption.

Thus, in the present invention, due to the provision of the phase signal transmitter which transmits a phase signal that differs corresponding to the rotation angle of the spindle, the rotation speed of the spindle needs not to be limited, resolution for the rotation angle of the spindle can be increased, and power consumption can be reduced.

In the above measuring instrument of the present invention, it is preferred that the phase signal transmitter includes a rotor that rotates integrally with the spindle, and a stator provided on the main body opposing to the rotor, the stator transmitting the phase signal corresponding to a rotation angle of the rotor, the stator further comprises two detecting tracks for detecting the rotation of the rotor and transmitting signals different from each other, the two tracks being a first track which transmits a first phase signal, and a second track that transmits a second phase signal varying at period different from that of the first phase signal, phase difference between the first phase signal and the second phase signal differs corresponding to rotation angle of the rotor, and the rotation angle calculator calculates the rotation angle of the rotor based on the phase difference.

With such a configuration, when the spindle rotates, the rotor rotates too together with the spindle, so that the rotation of the rotor is detected by the stator.

Herein, since the stator is provided with the first track and the second track for transmitting the phase signals, the first track transmitting the first phase signal, and the second track transmitting the second phase signal.

Since the first phase signal and the second phase signal vary at different periods from each other corresponding to the rotation of the rotor, and since phase difference between the first phase signal and the second phase signal differs corresponding to rotation angle of the rotor within one rotation of the rotor, the rotation angle can be uniquely determined based on the phase difference.

Further, since the rotor rotates integrally with the spindle, the rotation angle of the rotor equals to the rotation angle of the spindle, and therefore the absolute position of the spindle can be calculated based on the rotation angle of the spindle.

With such a configuration, the rotation angle of the rotor can be uniquely determined based on the phase difference between the two phase signals (the first phase signal and the second phase signal) which vary at different periods corresponding to the rotation of the rotor. Further, since the phase difference between the two phase signals (the first phase signal and the second phase signal) differs corresponding to the rotation of the rotor, the rotation angle of the rotor can be obtained by sampling the first phase signal and the second phase signal and calculating the phase difference between the two phase signals. Since it is unnecessary to perform increment of the signal sequentially, the varying speed of the phase signal is not a problem any more, the rotation speed of the spindle needs not to be limited, and further, by minutely varying the phase signal with respect to the rotation of the spindle, resolution for the rotation angle of the spindle can be increased.

Incidentally, since the rotation angle of the rotor can be obtained from phase difference between a plurality of phase signals, it is obvious that there may also be a third phase signal and even a fourth phase signal in addition to the first phase signal and the second phase signal.

In the above measuring instrument of the present invention, it is preferred that the stator includes transmitting terminals to which an AC signal is applied, and receiving terminals respectively having a predetermined number of detecting patterns corresponding to phase variation within one period, and that the rotor comprises coupled terminals electromagnetically coupled with the transmitting terminals and the receiving terminals, the coupled terminals having detecting patterns whose number corresponds to that of respective receiving terminals.

With such a configuration, when the AC signal is applied to the transmitting terminals, induction magnetic fields will be generated around the transmitting terminals due to the current of the transmitting terminals. Due to the induction magnetic fields generated around the transmitting terminals, induction currents will be generated in the coupled terminals electromagnetically coupled with the transmitting terminals. Due to the induction current of the coupled terminals, induction magnetic fields will be generated around the coupled terminals. Due to the induction magnetic fields generated around the coupled terminals, induction currents will be generated in the receiving terminals electromagnetically coupled with the coupled terminals. In other words, the signal is transmitted in an order of: transmitting terminals to coupled terminals and to receiving terminals. At this time, since the overlapping degree of the detecting patterns of the coupled terminals and the detecting patterns of the receiving terminals differs corresponding to the rotation of the rotor, the signals induced in the receiving terminals vary periodically corresponding to the rotation of the rotor. Thus the rotational phase of the rotor can be detected by sampling the signals of receiving terminals at a predetermined pitch.

With such a configuration, since the coupled terminals and the receiving terminals are electrode tracks having detecting patterns which periodically vary, the coupled terminals and the receiving terminals can be constituted by electrode wires which transmit/receive signals through electromagnetic coupling. For instance, both the detecting patterns of the coupled terminals and the detecting patterns of the receiving terminals can be formed by arraying a plurality of coils side by side, so that the signals having different phases can be obtained due to the difference of the overlapping degree of the detecting patterns of the coupled terminals and the detecting patterns of the receiving terminals. Further, since the patterns of the electrode wires are easy to be minutely formed in the case where the detecting patterns are constituted by the electrode wires, it is easy to minutely vary the phase signal corresponding to the rotation of the rotor by minutely forming the pattern of individual coil. Consequently, resolution for the rotation of the rotor can be increased.

Further, in the case of the conventional art in which the rotor and the stator are both provided with electrode plates on the confronted surfaces thereof to electrostatic couple with each other so that the rotation angle of the rotor can be detected by detecting potential change of the electrode plates, if the gap between the rotor and the stator fluctuates, the potential of the electrode plates will fluctuate too, and therefore the rotation angle of the rotor can not be detected accurately.

In the present invention, since the transmitting terminals and the receiving terminals of the stator and the coupled terminals of the rotor transmit/receive signals through electromagnetic coupling, the rotation angle of the rotor can be accurately detected without being affected by fluctuation of a gap between the stator and the rotor.

Incidentally, instead of the above configuration in which the stator is provided with the transmitting terminals and the receiving terminals and the rotor is provided with the coupled terminals, the configuration also can be such that the rotor is provided with the transmitting terminals and the receiving terminals, and the stator is provided with the coupled terminals. The configuration even can be such that the transmitting terminals, the coupled terminals, and the receiving terminals are respectively provided on separate members. In short, the configuration can be any as long as the transmitting terminals, the coupled terminals, and the receiving terminals are electromagnetically coupled with each other.

In the above measuring instrument of the present invention, it is preferred that the main body is provided with a spindle operation section for manually rotating the spindle, and that the phase signal transmitter samples the phase signal at such a pitch that the phase signal should be obtained three or more times for each rotation of the spindle when the spindle is rotated at an available highest rotational speed by manually operating the spindle operation section.

With such a configuration, when the spindle operation section is manually operated, the spindle will rotate, so that the phase signal will be output from the phase signal transmitter. The rotation angle of the spindle is calculated by the rotation angle calculator based on the phase signal, and further, the rotation number of the spindle is calculated by the rotation number calculator by sequentially monitoring the rotation angle calculated by the rotation angle calculator. Since the rotation number of the spindle is counted by the rotation number calculator, the phase signal transmitter needs to transmit the signal at a pitch of such a degree that the rotation number of the spindle will not be skip-read by the rotation number calculator.

In the present invention, since the rotation of the spindle can be caught up if the phase signal from the phase signal transmitter can be obtained three times for each rotation of the spindle while the spindle is rotated at an available highest rotational speed by manually operation, the rotation number of the spindle will not be skip-read by the rotation number calculator. On the other hand, since it is only necessary for the phase signal transmitter to transmit the signal at a pitch of such a degree that the rotation number of the spindle will not be skip-read by the rotation number calculator, the frequency of the transmission can be minimized compared to the conventional increment type. Further, since it is only necessary for the phase signal to be output three times for each rotation of the spindle, the rotation speed of the spindle is allowed to be increased up to the same level as the phase detecting speed of the phase signal transmitter. Accordingly, the spindle can be rotated at high speed, and the operational performance of the measuring instrument can be enhanced.

In the above measuring instrument of the present invention, it is preferred that the number of the detecting patterns provided to the receiving terminals and coupled terminals is nine or more.

With such a configuration, when the spindle rotates, the rotor rotates together with the spindle, so that the phase signal is output from the stator corresponding to the rotation angle of the rotor. The rotation angle of the rotor, namely the rotation angle of the spindle is detected based on the phase signal. Since the phase signal transmitter transmits phase signal which differs corresponding to the rotation angle of the spindle, the rotation angle of the spindle is uniquely calculated by the rotation angle calculator based on the rotational phase. In the case of conventional art in which the rotational phase is calculated by performing increment of the signal, the signal is prevented from being skip-read by reducing the frequency of signal variation per one rotation of the spindle, so that increment can be performed accurately. Accordingly, there arises a problem that resolution for the rotation angle of the spindle is restricted.

In the present invention, since it is unnecessary to perform increment of the signal as in the conventional art, there is no concern that the signal will be skip-read, therefore the phase signal can be minutely varied with respect to the rotation of the spindle. In other words, resolution for the rotation angle of the spindle can be increased by increasing the number of the detecting patterns of the receiving terminals and the coupled terminals to minutely vary the phase signal with respect to the rotation of the rotor.

In the above measuring instrument of the present invention, it is preferred that the spindle is displaced by 1 mm or more per one rotation.

Specifically, it is preferred that the main body is provided with a female thread, the spindle is provided with a lead screw which engages the female thread of the main body, and screw pitches of the female thread and the lead screw is 1 mm or more. Or it is preferred that the lead screw be a multiple thread screw.

With such a configuration, since the spindle is advanced/retreated by 1 mm or more per one rotation when the spindle is rotated, the spindle can be advanced/retreated at high speed, and the operational performance of the measuring instrument can be enhanced.

Conventionally, the rotational phase is calculated by performing increment of the signal corresponding to the rotation of the rotor, and the signal is prevented from being skip-read by reducing the frequency of signal variation per one rotation of the spindle so that increment can be performed accurately. Accordingly, there arises a problem that resolution for the rotation angle of the spindle is restricted.

In the present invention, since it is unnecessary to perform increment of the signal as in the conventional art, there is no concern that the signal will be skip-read, and therefore the phase signal can be minutely varied with respect to the rotation of the spindle. Thus, by increasing the resolution for the rotation angle of the spindle through minutely varying the phase signal with respect to the rotation of the spindle, the detection resolution for the absolute position of the spindle can be increased even if the advancing/retreating pitch of the spindle per one rotation is set large. Namely, the operational performance of the measuring instrument can be enhanced by increasing the advancing/retreating pitch of the spindle, and at the same time the resolution for the absolute position of the spindle can be increased, so that significant effects can be achieved.

In the above measuring instrument of the present invention, it is preferred that the spindle is provided with an engaging portion along the axial direction thereof; and the phase signal transmitter is provided with an engaging pin arranged on the rotor and engaged with the engaging portion, and a preloading unit that preloads the engaging pin toward the engaging portion.

With this arrangement, as the spindle is rotated, the rotation of the spindle is transmitted to the rotor because of the engagement between the engaging portion of the spindle and the engaging pin of the rotor. Accordingly, the rotor is rotated only by the same rotation angle as the spindle is, and the rotation angle of the rotor is read by the stator. Thus, the rotation angle of the spindle can be known, as well as the displacement of the spindle by the pitch per one rotation of the spindle.

With such a configuration, since the engaging pin is preloaded toward the engaging portion by the preloading unit, the engaging pin can be securely fit to the engaging portion without clearance, and thus the rotation of the spindle can be accurately transmitted to the rotor. Thus the rotation angle of the spindle can be accurately detected by reading the rotation angle of the rotor by the stator. For instance, in the case where the advancing/retreating amount per one rotation of the spindle is large, the detection resolution for the absolute position of the spindle can not be increased if the rotation angle can not be detected with high resolution, therefore the measurement will be considerably affected even if a small clearance is formed between the engaging pin and the engaging portion.

According to the present invention, since the engaging pin and the engaging portion are engaged with each other by the preloading unit without clearance, the rotation of the spindle can be accurately transmitted to the rotor. Consequently, the measurement accuracy can be enhanced.

In the above measuring instrument of the present invention, it is preferred that the engaging pin is slidable relative to the rotor in a direction perpendicular to the axial direction of the spindle, and the preloading unit comprises a leaf spring attached on the rotor, the leaf spring biasing the engaging pin toward the engaging portion.

With such a configuration, since the engaging pin is preloaded toward the engaging portion due to the elasticity of the leaf spring, the engaging pin can slide on the engaging portion as well as the engaging pin can fit to the engaging portion without clearance. Accordingly, the rotation of the spindle can be accurately transmitted to the rotor. Owing to this, the reading error of the rotation angle of the spindle can be reduced, and the measurement accuracy can be enhanced.

Incidentally, the engaging pin can also be preloaded toward the engaging portion in such a manner that the engaging pin is screwed into the rotor until the tip end of the engaging pin strongly abuts on the engaging portion of the spindle.

In the above measuring instrument of the present invention, it is preferred that the phase signal transmitter is provided with an engaging pin supporter which prevents the engaging pin from escaping from the rotor.

With such a configuration, due to the engaging pin supporter, the engaging pin is prevented from escaping from the rotor. Since the engaging pin is retained in its position even when the spindle is pulled out from the rotor, the spindle can be easily reset to the rotor after being pulled out from the rotor. For instance, in the case where the engaging pin is escaped from the rotor when the spindle is pulled out from the rotor, the engaging pin may become an obstacle when the spindle is being reset into the rotor, or the engaging pin has to be reinserted into the rotor so as to be engaged with the engaging portion of the spindle, which will require very long time.

In the present invention, since the engaging pin is prevented by the engaging pin supporter from escaping from the rotor, the engaging pin is retained in its position even when the spindle is pulled out from the rotor, the spindle can be easily reset to the rotor. Thus the spindle can be easily replaced.

In the above measuring instrument of the present invention, it is preferred that the main body includes a spindle operation section for manually rotating the spindle, the spindle operation section further includes: a cap tube rotatably arranged on an outer surface of the main body, and a constant-pressure mechanism arranged between the cap tube and the spindle, the constant-pressure mechanism operating in a manner that, when a load acting between the cap tube and the spindle is lower than a predetermined value, the constant-pressure mechanism transmits the rotation of the cap tube to the spindle; and when the load is equal to or higher than the predetermined value, the constant-pressure mechanism runs idle between the cap tube and the spindle.

With such a configuration, when the cap tube is rotated by a load lower than a predetermined value, the rotation of the cap tube will be transmitted to the spindle via the constant-pressure mechanism, so that the spindle rotates. Thus the spindle advances/retreats. When the cap tube is rotated by a load equal to or higher than the predetermined value, the constant-pressure mechanism will run idle, so that the rotation of the cap tube will not be transmitted to the spindle. Since the spindle will not be rotated under a load equal to or higher than a predetermined value due to the idle running of the constant-pressure mechanism, when the spindle comes into contact with the workpiece, the contact pressure of the spindle can be limited to a pressure equal to or lower than a predetermined value. Thus the workpiece will not be damaged by the spindle.

Particularly, when the advancing/retreating pitch per one rotation of the spindle is set large, there is concern that the workpiece may be damaged due to the high speed displacement of the spindle. However, in the present invention, since the spindle is prevented from being rotated under a load equal to or higher than the predetermined value, the workpiece will not be damaged by the spindle.

DETAILED DESCRIPTION OF PREFERRED EMBODIMENT(S)

Figure 1:
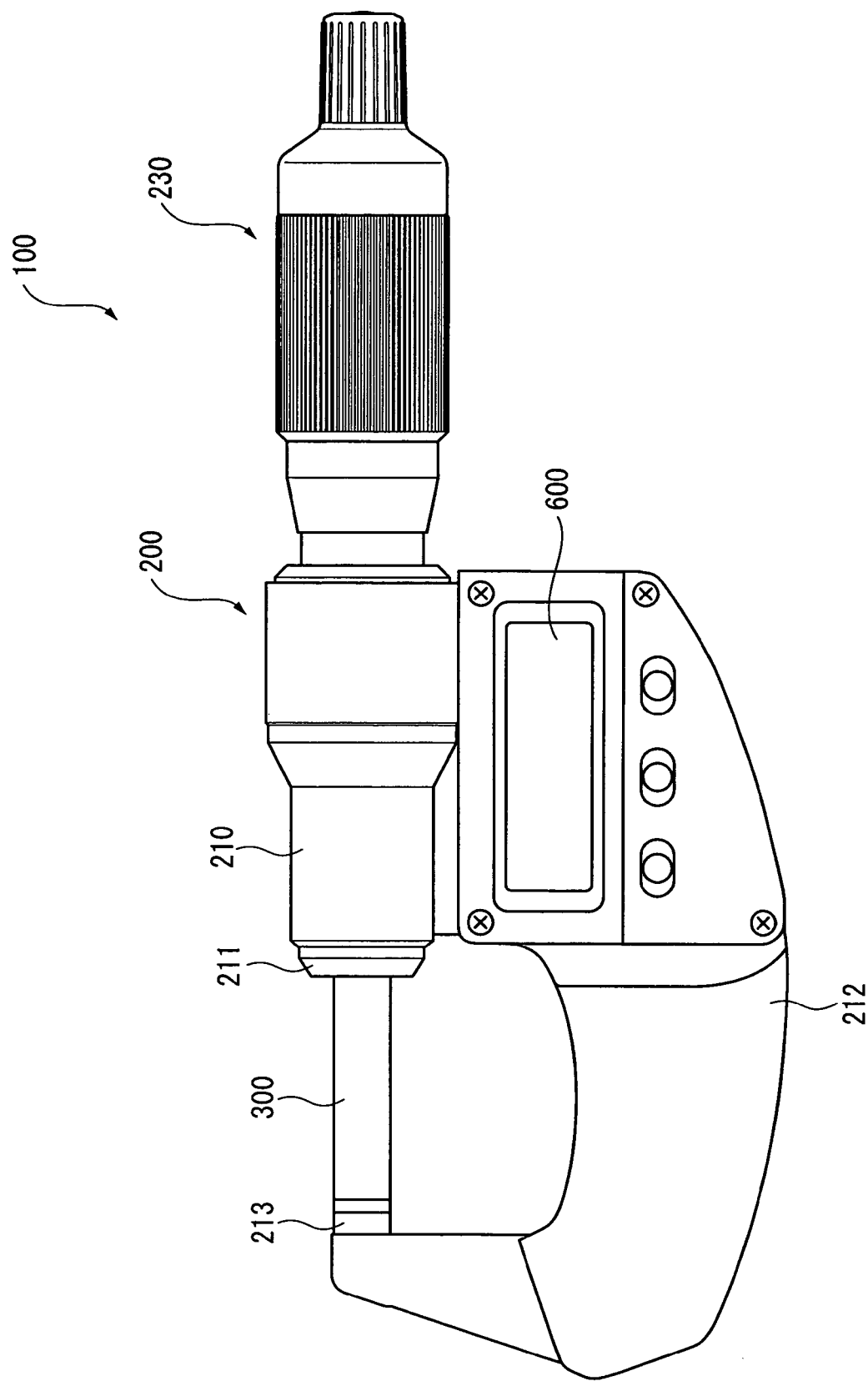
FIG. 1 is an illustration showing the entire structure of a micrometer according to a first embodiment of the present invention.

Embodiments of the present invention will be described below with reference to the attached drawings and numerals assigned to the respective elements in the drawings.

First Embodiment

A first embodiment of the measuring instrument according to the present invention will be described below.

FIG. 1 is an illustration showing the entire structure of a micrometer 100 of the first embodiment.

Figure 2:
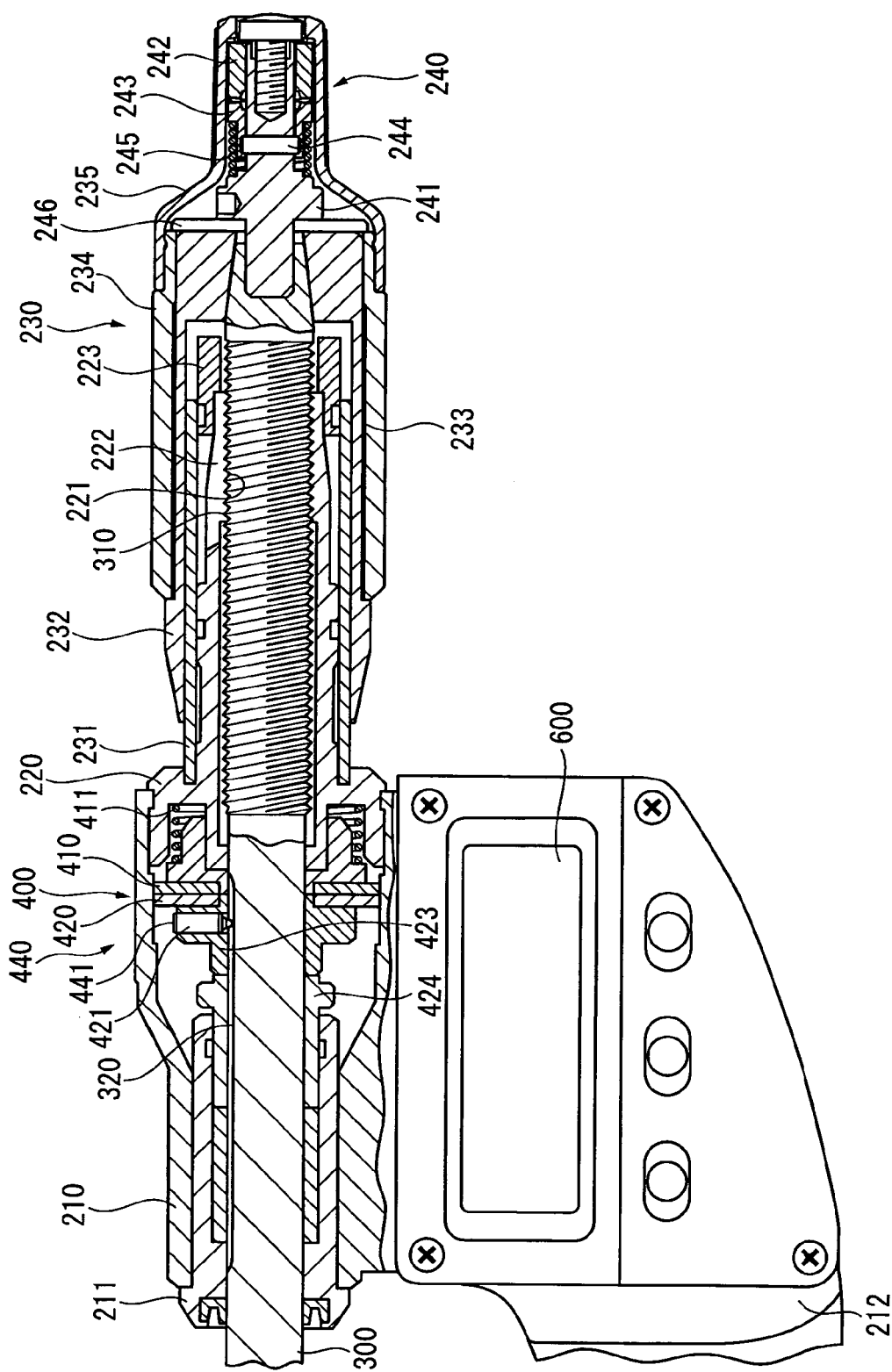
FIG. 2 is a cross section of the first embodiment.

FIG. 2 is a cross section of the micrometer 100.

Figure 3:
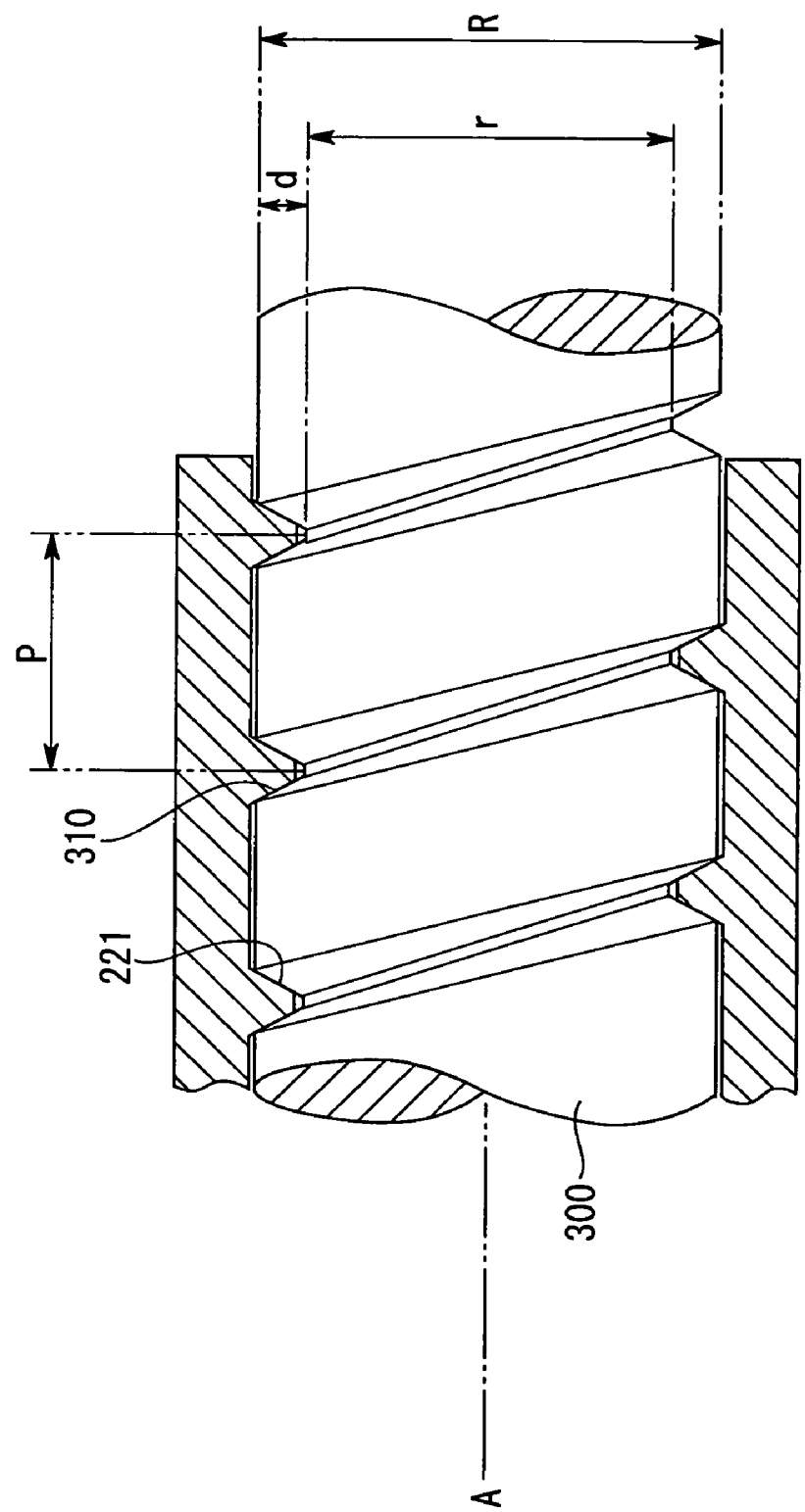
FIG. 3 is an illustration showing the profile of a lead screw of a spindle of the first embodiment.

FIG. 3 is an illustration showing the profile of a lead screw 310 of a spindle 300.

Figure 4:
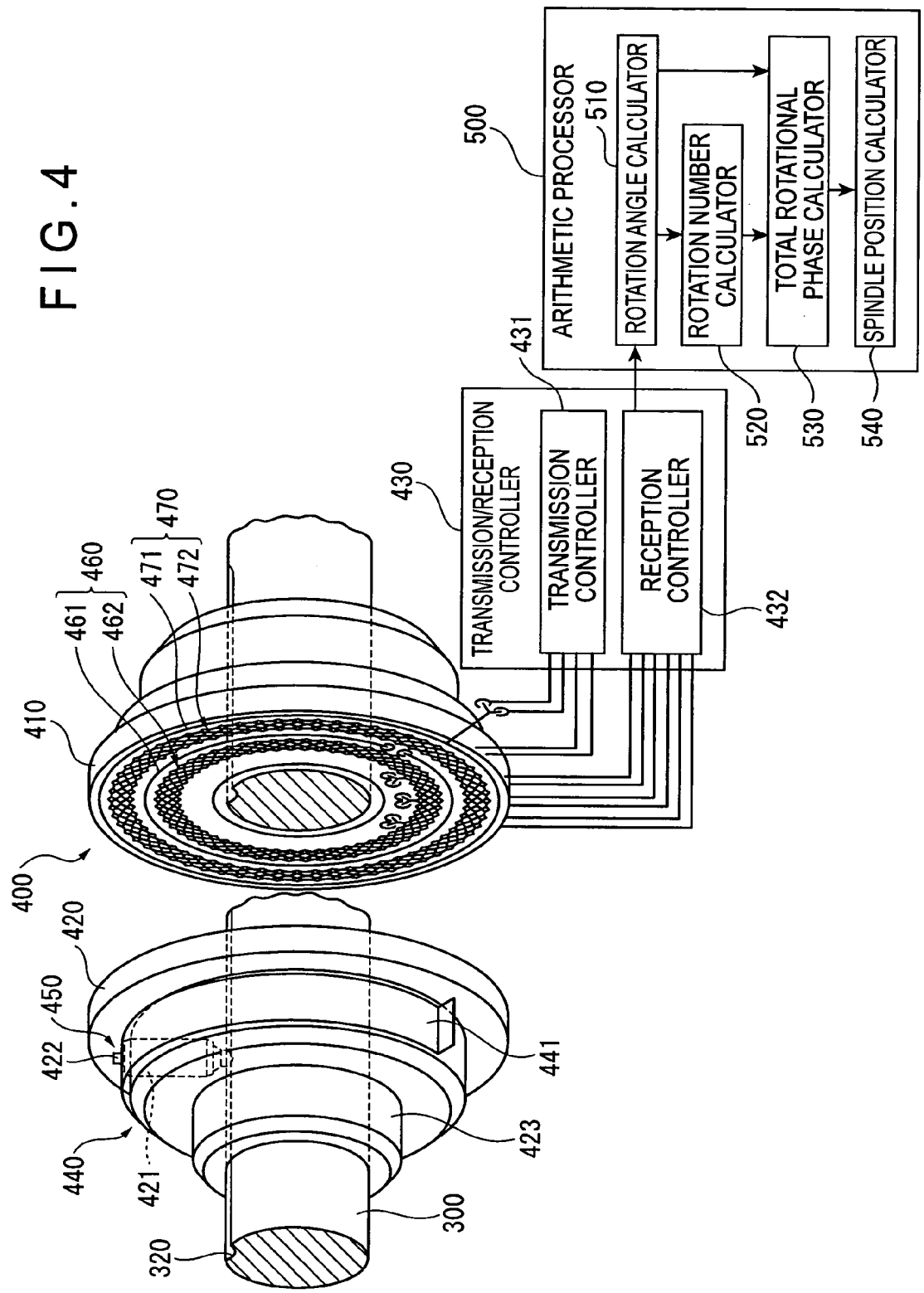
FIG. 4 is an illustration showing the configuration of a phase signal transmitter of the first embodiment.

FIG. 4 is an illustration showing the configuration of a phase signal transmitter 400.

This micrometer 100 includes a main body 200 having an anvil 213 at an end of a substantially U-shaped frame 212, a spindle 300 screwed at the other end of the main body 200 and being advanced to and retreated from the anvil 213 in an axial direction along with its screwing rotation, a phase signal transmitter 400 that outputs a phase signal in accordance with a rotational amount of the spindle 300, an arithmetic processor 500 that arithmetically processes the phase signal to calculate the absolute position of the spindle 300, and a digital display 600 as a display unit for displaying the calculated absolute position of the spindle.

The main body 200 includes a front tube 210, a rear tube 220 and a spindle operation section 230 sequentially arranged from an end of the main body 200. The front tube 210 has a stem 211 provided on an opening of an end of the front tube 210, and the U-shaped frame 212 provided on the outside thereof. One end of the U-shaped frame 212 is provided with the anvil 213, which faces to the spindle 300, and the other end of the U-shaped frame 212 is fixed to the front tube 210, the surface of the U-shaped frame 212 being provided with the digital display 600.

The rear tube 220 is connected to the front tube 210 at an end thereof, has a female thread 221 at the inner periphery of the other end thereof to screw with the spindle 300, is formed with slitting 222 at the other end thereof, and besides, is fixed by a nut 223 from the outside thereof.

The spindle operation section 230 includes a guide tube 231 layered on the rear tube 220, an outer sleeve 232 rotatably provided on the guide tube 231, a thimble 234 provided on the outer sleeve 232 with a friction spring 233 interposed therebetween, a cap tube 235 provided on the other ends of the outer sleeve 232 and the thimble 234, and a constant-pressure mechanism 240.

The cap tube 235 is connected to the outer sleeve 232 by screwing. As shown in FIG. 2, the constant-pressure mechanism 240 includes a support shaft 241 with one end screwed to an outer end of the spindle 300, a first ratchet wheel 242 fixed to the inner circumference of the cap tube 235, a second ratchet wheel 243 engaged with the first ratchet wheel 242, a compression coil spring 245 that biases the second ratchet wheel 243 toward the first ratchet wheel 242, and a stopper 246 fixed to the support shaft 241 and abutting on the other end of the guide tube 231.

Saw-like teeth are respectively formed on the first ratchet wheel 242 and the second ratchet wheel 243 at a predetermined pitch, so that the first ratchet wheel 242 and the second ratchet wheel 243 engage with each other through the teeth. When subjected to a pressure lower than a predetermined value, the first ratchet wheel 242 and the second ratchet wheel 243 will integrally rotate in a state where the teeth of the first ratchet wheel 242 engage with the teeth of the second ratchet wheel 243; while when a load equal to or higher than the predetermined value is applied on the an engagement surface between the first ratchet wheel 242 and the second ratchet wheel 243, the first ratchet wheel 242 will run idle against the second ratchet wheel 243. Due to the provision of the key 244, the second ratchet wheel 243 is displaceable against the support shaft 241 in axial direction but unrotatable against the support shaft 241 in rotation direction, that is, the second ratchet wheel 243 rotates integrally with the support shaft 241.

The spindle 300 projects from one end of the main body 200 to the outside by being inserted through the stem 211, and is provided with the lead screw 310 on the outer periphery of the other end of the spindle 300 to screw with the female thread 221 of the rear tube 220. The other end of the spindle 300 is tapered so as to have decreased diameter, and is fitted into the other end of the outer sleeve 232. An engaging groove (engaging portion) 320 is formed on the spindle 300 along the axial direction.

As shown in FIG. 3, the lead screw 310 is a male screw which has a relatively large pitch P but a relatively small thread height d. In other words, the pitch P of the lead screw 310 is twice as large or more than the difference between its outer diameter R and its root diameter r, and the difference between the outer diameter R and the root diameter r is one-fifth or less of the outer diameter R. When seen along a screw axis line A, adjacent thread grooves are formed at a predetermined interval, and an intermediate portion of the thread grooves is defined between the adjacent thread grooves as a straight line along the screw axis line A on a cross-section along the screw axis line A.

The lead screw 310 has its dimensions of, for instance, approximately 7.25 to 7.32 mm as the outer diameter R, approximately 6.66 to 6.74 mm as the root diameter r, approximately 1 to 2 mm as the thread pitch P, approximately 55 to 65 degrees as an apex angle q of a screw root thread, and approximately 5 degrees as a thread lead angle.

Note that, the dimensions of the lead screw 310 are not limited particularly, and are appropriately chosen depending on how a lead (i.e., the advancing/retreating amount per one rotation of the spindle 300) is decided.

For example, the pitch P of the lead screw 310 may be triple, quintuple or decuple of the difference between the outer diameter R and the root diameter r, and the difference between the outer diameter R and the root diameter r may be one-seventh or one-tenth of the outer diameter R.

The female thread 221 has the same pitch as that of the lead screw 310. When seeing the female thread 221 along the screw axis line A, the adjacent screw threads are formed at a predetermined interval, and an intermediate portion of the threads is defined between the adjacent screw threads as a straight line along the screw axis line A on a cross-section along the screw axis line A.

Figure 5A:
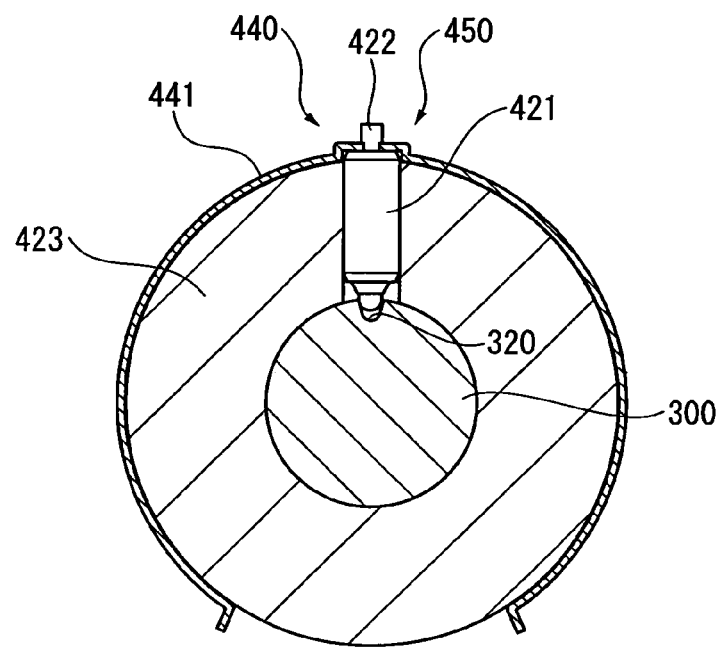
FIG. 5A and FIG. 5B are cross sections respectively showing engaging state of an engaging pin with an engaging groove.
Figure 5B:
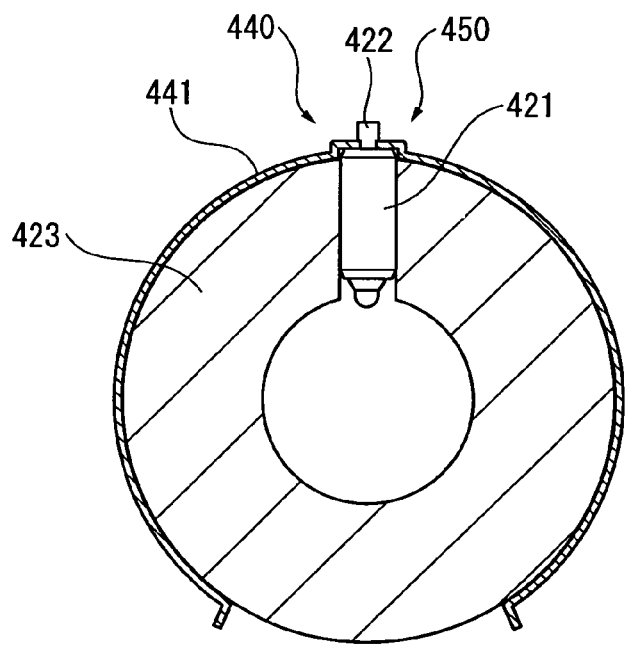

As shown in FIG. 4, FIG. 5A, and FIG. 5B, the phase signal transmitter 400 has a stator 410 provided on the main body 200, a rotor 420 opposed to the stator 410, a transmission/reception controller 430 that controls the transmission/reception of the signal to/from the stator 410, an engaging groove 320 formed on the spindle 300 along the axial direction, an engaging pin 421 arranged in the rotor 420 to engage with the engaging groove 320, a preloading unit 440 that preloads the engaging pin 421 toward the engaging groove 320, and an engaging pin supporter 450 that supports the engaging pin 421 so that the engaging pin 421 does not escape from the rotor 420.

Note that, in FIG. 4, in order to clearly illustrate each component, the stator 410 and the rotor 420 are separated from each other by a distance larger than the actual distance therebetween.

The stator 410 is fixed inside the front tube 210 on an end of the rear tube 220, and the rotation of the stator 410 is restricted. A spring 411 is interposed between the stator 410 and the rear tube 220 so that the stator 410 is biased toward one end thereof. The rotor 420 has a rotor bushing 423, which can rotate independently against the spindle 300, the rotor 420 being arranged on the other end of the rotor bushing 423 to face to the stator 410. The rotor bushing 423 is biased toward the other end by an adjustment screw 424 screwed with the stem 211. The spindle 300 is inserted though the stator 410 and the rotor 420.

Incidentally, the construction of the transmission/reception controller 430 and the details of the signal control to the stator 410 by the transmission/reception controller 430 will be described later.

The engaging groove 320 is linearly formed in parallel with the axis of the spindle 300. The engaging groove 320 has a substantially V-shaped cross section whose apex angle is about 60 to 90 degrees (refer to FIG. 5A and FIG. 5B).

The engaging pin 421, which is provided with a spherical tip ball for its tip end section, is inserted into a through-hole formed in the rotor bushing 423. The diameter of the tip ball is about 0.8 to 1.5 mm. The tip ball is engaged with the engaging groove 320.

The preloading unit 440 includes a ringed leaf spring 441 which is formed by bending a leaf spring into a ring shape. The ringed leaf spring 441 can be either discontinuous ring-shaped, of which one end is separated from the other end, or continuous ring-shaped, of which one end is overlapped with the other end. The ringed leaf spring 441 is fitted on the outer surface of the rotor bushing 423, in a state where the engaging pin 421 has been inserted into the rotor bushing 423, to bias a base end of the engaging pin 421 toward the spindle 300. At this time, a small pin 422 projected from the engaging pin 421 is inserted into the ringed leaf spring 441 in an inescapable manner, so that the engaging pin 421 is locked by the ringed leaf spring 441.

The engaging pin 421 is locked by the ringed leaf spring 441, whereby the engaging pin supporter 450 is constituted. With the engaging pin supporter 450, since the engaging pin is locked by the ringed leaf spring 441, even when the spindle 300 is pulled out from the rotor 420 as shown in FIG. 5B, the engaging pin will not escape from the rotor bushing 423, so that the position of the engaging pin is maintained substantially unchanged.

The principle of detecting a rotational phase of the rotor 420 with the stator 410 in the phase signal transmitter 400 will be briefly described below.

The phase signal transmitter 400 is a so called single-rotation ABS (absolute detection) rotary encoder.

Figure 6:
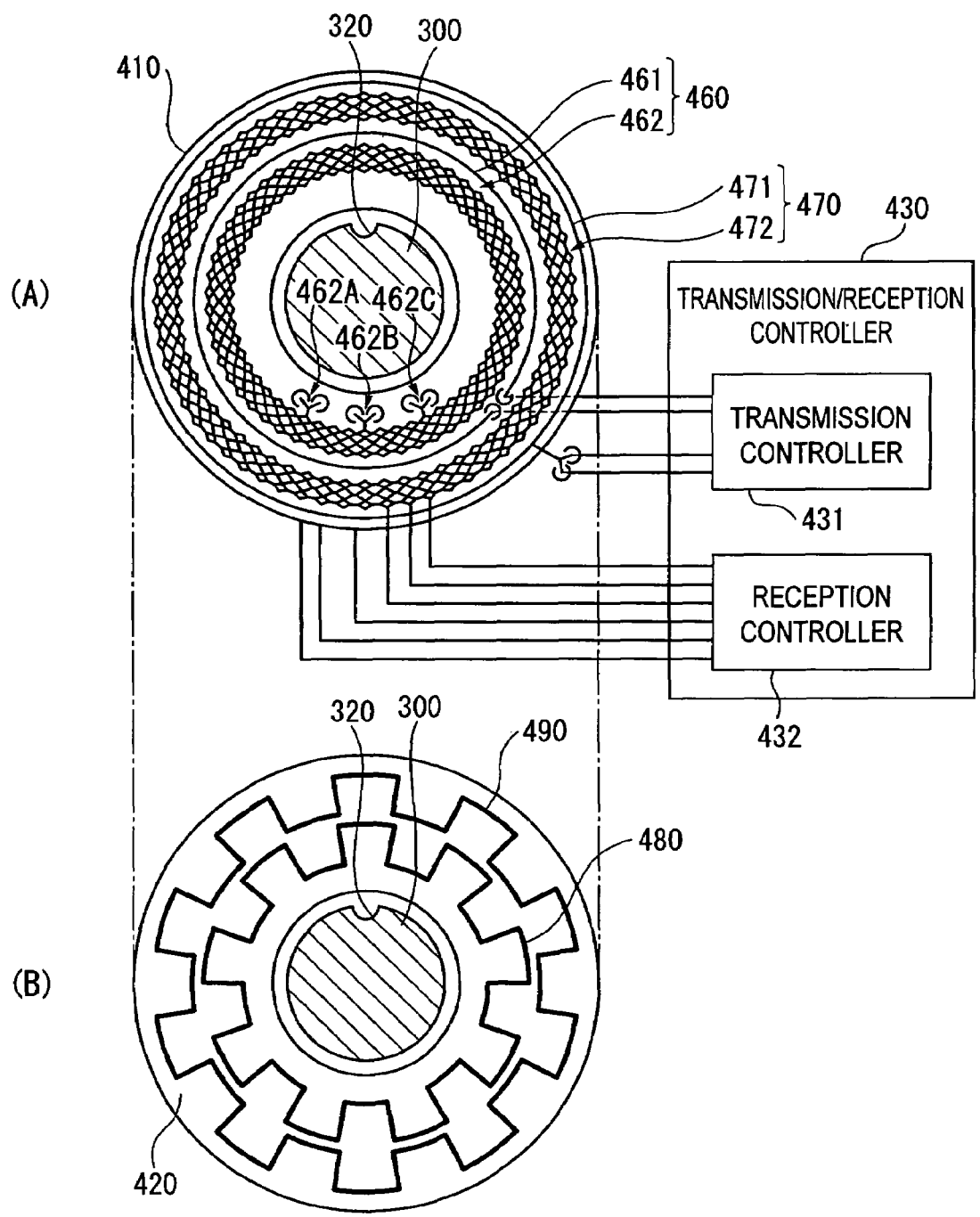
FIG. 6 is an illustration showing a stator and a rotor of the first embodiment.

FIG. 6 shows confronted surfaces of the stator 410 and the rotor 420.

FIG. 6(A) shows the surface of the stator 410, and FIG. 6(B) shows the surface of the rotor 420.

In the stator 410, two electrode portions are provided respectively on an inner side and an outer side on the surface opposed to the rotor 420. In other words, a first stator electrode portion 460 (a first track) is provided on the inner side, and a second stator electrode portion 470 (a second track) is provided outside the first stator electrode portion 460 (refer to FIG. 6(A)).

The first stator electrode portion 460 and the second stator electrode portion 470 are connected to the transmission/reception controller 430. In the rotor 420, two electrode portions are provided respectively on an inner side and an outer side on the surface opposed to the stator 410. In other words, a first coupling electrode portion 480 electromagnetically coupled with the first stator electrode portion 460 is provided on the inner side, and a second coupling electrode portion 490 electromagnetically coupled with the second stator electrode portion 470 is provided on the outer side (refer to FIG. 6(B)).

The transmission/reception controller 430 includes a transmission controller 431 and a reception controller 432. The transmission controller 431 transmits a predetermined signal to the first stator electrode portion 460 and the second stator electrode portion 470, and the reception controller 432 receives the signal from the first stator electrode portion 460 and the second stator electrode portion 470.

First, the first stator electrode portion 460 and the second stator electrode portion 470 will be described below with reference to FIG. 6(A).

The first stator electrode portion 460 includes a first transmitting electrode portion 461, which is constituted by a ring-shaped electrode wire, and a first receiving electrode portion 462 arranged on the inner side of the first transmitting electrode portion 461. The first receiving electrode portion 462, which shows a ring-shape as a whole, is constituted by three electrode wires of 462A to 462C each having rhombuses continued at a predetermined pitch.

Similarly, the second stator electrode portion 470 includes a second transmitting electrode portion 471, which is constituted by a ring-shaped electrode wire, and second receiving electrode portion 472 arranged on the inner side of the second transmitting electrode portion 471. The second receiving electrode portion 472, which shows a ring-shape as a whole, is constituted by three electrode wires of 472A to 472C, each having rhombuses continued at a predetermined pitch.

The electrode wires 462A to 462C, which constitute the first receiving electrode portion 462, respectively have nine (nine cycles of) rhombuses, and the electrode wires 472A to 472C, which constitute the second receiving electrode portion 472, respectively have ten (ten cycles of) rhombuses. In both the first receiving electrode portion 462 and second receiving electrode portion 472, the three electrode wires are overlapped with each other in a manner that the phases thereof are mutually shifted.

Incidentally, in FIG. 6(A), the parts where the wires appear to be crossed with each other are actually separated from each other in a direction vertical to the paper surface of the figure, so that insulation is ensured.

Incidentally, the first receiving electrode portion 462 and the second receiving electrode portion 472 are respectively equivalent to a structure obtained by connecting a plurality of independent ring-shaped coils with an electrode wire. In other words, each rhombus functions as a coil.

The electrode wires of both the first transmitting electrode portion 461 and the second transmitting electrode portion 471 are respectively connected to the transmission controller 431, and a predetermined AC signal from the transmission controller 431 is applied to each electrode wire.

The electrode wires of both the first receiving electrode portion 462 and the second receiving electrode portion 472 are respectively connected to the reception controller 432, and the signals of the first receiving electrode portion 462 and the second receiving electrode portion 472 are sampled by the reception controller 432 at a predetermined sampling period.

Next, the first coupling electrode portion 480 and the second coupling electrode portion 490 will be described below with reference to FIG. 6(B).

The first coupling electrode portion 480 is constituted by an electrode wire, which shows a ring shape as a whole, while having rectangular wave shape along a circumferential direction. Similar to the first coupling electrode portion 480, the second coupling electrode portion 490 is also constituted by an electrode wire, which shows a ring shape as a whole, while having rectangular wave shape along circumferential direction.

Incidentally, the rectangular wave of the first coupling electrode portion 480 includes nine cycles, while the rectangular wave of the second coupling electrode portion 490 includes ten cycles. Further, the first coupling electrode portion 480 and the second coupling electrode portion 490 are respectively equivalent to a structure obtained by connecting a plurality of independent ring-shaped coils with an electrode wire. In other words, each rectangular part functions as a coil.

With such an arrangement, when currents (AC currents) (i1) respectively flow from the transmission controller 431 to the first transmitting electrode portion 461 and the second transmitting electrode portion 471, induction magnetic fields (B1) are respectively generated around the electrode wires of the first transmitting electrode portion 461 and the second transmitting electrode portion 471.

Since the first stator electrode portion 460 is electromagnetically coupled with the first coupling electrode portion 480 and the second stator electrode portion 470 is electromagnetically coupled with the second coupling electrode portion 490, induction currents (i2) are respectively generated in the first coupling electrode portion 480 and the second coupling electrode portion 490, and at the same time, induction magnetic fields (B2, B3) are generated by the induction currents (i2).

Further, since the first coupling electrode portion 480 is electromagnetically coupled with the first receiving electrode portion 462 and the second coupling electrode portion 490 is electromagnetically coupled with the second receiving electrode portion 472, induction currents (i3) are respectively generated in the first receiving electrode portion 462 and the second receiving electrode portion 472 according to the magnetic field patterns of the first coupling electrode portion 480 and the second coupling electrode portion 490.

Since the first coupling electrode portion 480 and the first receiving electrode portion 462 respectively include nine cycles while the second coupling electrode portion 490 and the second receiving electrode portion 472 respectively include ten cycles, for each rotation of the rotor 420, a first detected phase detected by the first receiving electrode portion 462 shows a phase variation of ten cycles while a second detected phase detected by the second receiving electrode portion 472 shows a phase variation of nine cycles. Accordingly, to a rotation angle θ (0°≦θ<360°) of the rotor 420, a first phase signal φ1 from the first receiving electrode portion 462 defers from a second phase signal φ2 from the second receiving electrode portion 472. Thus, phase difference Δφ between the first phase signal φ1 and the second phase signal φ2 differs corresponding to the rotation angle θ of the rotor 420 within one rotation of the rotor 420. Inversely, the rotational phase θ within one rotation of the rotor 420 can be uniquely determined based on the phase difference Δφ between the first phase signal φ1 and the second phase signal φ2.

Incidentally, the sampling period with which the signal of the first receiving electrode portion 462 and the signal the second receiving electrode portion 472 are sampled by the reception controller 432 is about 12.5 ms.

The arithmetic processor 500 will be described below.

The arithmetic processor 500 includes a rotation angle calculator 510 that calculates the rotation angle θ of the rotor 420, a rotation number calculator 520 that counts and calculates the rotation number of the rotor 420, a total rotational phase calculator 530 that calculates the total rotational phase of the rotor 420, and a spindle position calculator 540 that calculates the absolute position of the spindle 300.

The rotation angle calculator obtains the first phase signal φ1 from the first receiving electrode portion 462 and the second phase signal φ2 from the second receiving electrode portion 472 based on the signal of the first receiving electrode portion 462 and the signal of the second receiving electrode portion 472 respectively sampled by the reception controller 432, and further, the rotation angle calculator calculates the rotation angle θ (0°≦θ<360°) of the rotor 420 based on the phase difference Δφ between the first phase signal φ1 and the second phase signal φ2.

The rotation number calculator 520 monitors the rotation angle θ of the rotor 420 calculated by the rotation angle calculator 510 to count the rotation number of the rotor 420. For instance, when the phase θ of the rotor 420 changes in the order of 5°, 95°, 185°, 275°, and 5°, since 360° is passed through during the change from 275° to 5°, it is counted by the rotation angle calculator 510 that the rotor 420 is rotated for +1 rotation.

Similarly, when the phase θ of the rotor 420 changes from 5° to 275°, since 360° is passed through by reverse rotation of the rotor 420, it is counted by the rotation angle calculator 510 that the rotor 420 is rotated for −1 rotation.

The rotation number at the time when the spindle 300 is in a reference position is determined to be zero, from which the rotation number N of the rotor 420 is counted by the rotation number calculator 520. The total rotational phase calculator 530 calculates the total rotational phase of the rotor 420 based on the rotation number N of the rotor 420 counted by the rotation number calculator 520 and the rotation angle θ of the rotor 420 calculated by the rotation angle calculator 510. For instance, in the case where the rotation number N of the rotor 420 counted by the rotation number calculator 520 is 2, and the rotation angle θ of the rotor 420 calculated by the rotation angle calculator 510 is 45°, then the total rotational phase calculated by the total rotational phase calculator 530 will be 765° (=360°×2+45°).

The spindle position calculator 540 calculates the absolute position of the spindle 300 based on the total rotational phase of the rotor 420 calculated by the total rotational phase calculator 530. In the case where the pitch of the spindle 300 per one rotation is 2 mm and the total rotational phase of the rotor 420 is 765°, the absolute position of the spindle 300 will be 4.25 mm (=765°÷365°×2) mm.

The phase signal transmitter 400 and the arithmetic processor 500 constitute a detector for detecting a position of the spindle.

The digital display 600 displays the absolute position of the spindle 300 calculated by spindle position calculator 540.

The operation of the first embodiment having the above arrangement will be described below.

First, when the cap tube 235 of the spindle operation section 230 is rotated, the first ratchet wheel 242 is rotated integrally with the cap tube 235. Since the first ratchet wheel 242 is engaged with the second ratchet wheel 243, the rotation of the first ratchet wheel 242 is transmitted to the second ratchet wheel 243, so that the support shaft 241 is rotated together with the second ratchet wheel 243. Since the spindle 300 rotates together with the support shaft 241, due to the engagement between the female thread 221 of the main body 200 (the rear tube 220) and the lead screw 310 of the spindle 300, the spindle 300 will advance/retreat in the axial direction. When the spindle 300 rotates, the rotor 420 will rotate together with the spindle 300 due to the provision of the engaging pin 421 engaged to the engaging groove 320 of the spindle 300.

The rotation of the rotor 420 is detected by the stator 410, and the signals from respective electrode wires of the first receiving electrode portion 462 and the second receiving electrode portion 472 of the stator 410 are sampled by the reception controller 432.

Further, the rotation angle of the rotor 420 is calculated by the rotation angle calculator 510 based on the phase difference between the first phase signal φ1 of the first receiving electrode portion 462 and the second phase signal φ2 of the second receiving electrode portion 472. The rotation number calculator 520 monitors the rotation angle θ calculated by the rotation angle calculator 510 and counts the rotation number of the rotor 420.

The total rotational phase of the rotor 420 is calculated by the total rotational phase calculator 530 based on the rotation angle θ calculated by the rotation angle calculator 510 and the rotation number of the rotor 420 counted by the rotation number calculator 520. Since the total rotational phase of the rotor 420 calculated by the total rotational phase calculator 530 is the total rotational phase of the spindle 300, the absolute position of the spindle 300 can be calculated by the spindle position calculator 540 based on the total rotational phase of the spindle 300 and the advancing/retreating pitch (2 mm, for instance) per one rotation of the spindle 300.

The calculated position of the spindle is displayed on the digital display 600.

When the spindle 300 is displaced by operating the spindle operation section 230 so as to abut on the workpiece, the spindle 300 can not be further moved. At this time, if the spindle 300 is forcibly rotated, a load equal to or higher than a predetermined value will be generated between the first ratchet wheel 242 and the second ratchet wheel 243, so that the first ratchet wheel 242 will run idle against the second ratchet wheel 243. Since the first ratchet wheel 242 runs idle, the rotating operation of the spindle operation section 230 will not be transmitted to the spindle 300 when a load equal to or higher than a predetermined value is applied, so that the spindle 300 will not be pushed by a pressure equal to or higher than a predetermined value and thereby the workpiece is prevented from being damaged.

With the first embodiment having the above arrangement, the following advantages can be achieved.

(1) Since the rotational phase of the spindle 300 is obtained based on the phase signals from the phase signal transmitter 400, and since the phase difference $\Delta\phi$ between the first phase signal $\phi1$ and the second phase signal $\phi2$ differs corresponding to the rotation angle of the rotor 420 within one rotation of the spindle 300, the rotation angle can be uniquely determined based on the phase difference $\Delta\phi$.

Since it is unnecessary to perform increment of a signal as in a conventional art, and since there is no concern that the signal will be skip-read due to high speed rotation of the spindle 300, the rotation speed of the spindle 300 needs not to be limited, and therefore operational performance of the micrometer 100 can be improved.

(2) Since the rotation angle of the spindle 300 can be uniquely determined based on the phase signals from the phase signal transmitter 400, and since there is no concern that the signal will be skip-read as in a conventional increment type art, the phase signal can vary minutely with respect to the rotation of the spindle 300. By minutely varying the phase signal with respect to the rotation of the spindle 300, resolution for the rotation angle of the spindle 300 can be increased. Particularly, in the present embodiment, although the advancing/retreating pitch per one rotation of the spindle 300 is set large in order to improve operational performance, by minutely varying the phase signal with respect to the rotation of the spindle 300, resolving power with respect to the rotation of the spindle 300 can be increased, so that the displacement of the spindle 300 can be detected with high resolution.

(3) Since it is only necessary for the phase signal transmitter 400 to transmit signal at a pitch of such a degree that the rotation number of the spindle 300 will not be skip-read by the rotation number calculator 520, the frequency of transmission can be minimized compared to the conventional increment type art, which results in lower power consumption.

(4) Since the first and second stator electrode portions 460, 470, and the first and second coupling electrode portions 480, 490, are respectively constituted by the electrode wires of 462A to 462C, and the electrode wires of 472A to 472C, it becomes easy to finely form the pattern of the electrode wires. Thus the resolution for the rotation angle of the rotor 420 can be increased by minutely varying the phase signal with respect to the rotation angle of the rotor 420. Further, since the first and second stator electrode portions 460, 470, and the first and second coupling electrode portions 480, 490 transmit/receive signals through electromagnetic coupling, the rotation angle of the rotor 420 can be accurately detected without being affected by fluctuation of a gap between the stator 410 and the rotor 420.

(5) Since the engaging pin 421 is pressured toward the engaging groove 320 by the ringed leaf spring 441 (the preloading unit 440), the engaging pin 421 and the engaging groove 320 engage with each other securely without forming a gap therebetween, therefore the rotation of the spindle 300 can be accurately transmitted to the rotor 420. Thus the rotation angle of the spindle 300 can be accurately detected by reading the rotation angle of the rotor 420 by the stator 410. Despite the fact that a small reading error of the rotation angle will lead to a large detecting error of the spindle position when the advancing/retreating amount per one rotation of the spindle 300 is set large, since the rotation angle of the spindle 300 can be accurately detected, measurement accuracy can be improved.

(6) Since the engaging pin 421 is retained in its position by the engaging pin supporter 450 even when the spindle 300 is pulled out from the rotor 420, the spindle 300 can be easily reset to the rotor 420 after being pulled out from the rotor 420. Thus the spindle 300 can be easily replaced.

(7) Since the constant-pressure mechanism 240 is provided, if a load equal to or higher than a predetermined value is applied while turning the cap tube 235 of the spindle operation section 230, the constant-pressure mechanism 240 will run idle, so that the rotation of the cap tube 235 will not be transmitted to the spindle 300. Thus, when the spindle 300 comes into contact with the workpiece, the contact pressure of the spindle 300 can be limited to a pressure equal to or lower than a predetermined value. Thus the workpiece will not be damaged by the spindle 300. Particularly, when the advancing/retreating pitch per one rotation of the spindle 300 is set large, there is concern that the workpiece may be damaged due to the high speed displacement of the spindle 300. However, in the present embodiment, since the spindle 300 is prevented from being rotated under a load equal to or higher than a predetermined value, the workpiece will not be damaged by the spindle 300.

(8) Since the phase signal transmitter 400, which performs absolute detection of the rotation angle of the spindle 300 within one rotation of the spindle 300, is constituted mainly by the rotor 420 that rotates together with the spindle 300 and the stator 410 that detects the rotation angle of the rotor 420, the phase signal transmitter 400 can be made small in size. Although an encoder for detecting the absolute position of the spindle 300 may be used for instance, since such an encoder for detecting the absolute position of a linearly moving object is a linear type and therefore large in size, it will be difficult to be applied to a micrometer 100 which is a small tool. However, in the present embodiment, since only the rotation angle $\theta$ of the spindle 300 is subject to absolute detection, a miniaturized rotary type phase signal transmitter 400 can be achieved.

(Modifications)

Modifications 1 to 4 will be described below with reference to FIGS. 7 to 10.

The modifications 1 to 4 are the same as the first embodiment in basic structure but differ from the first embodiment in the shape of the engaging pin 421 and the structure of the preloading unit 440.

Figure 7:
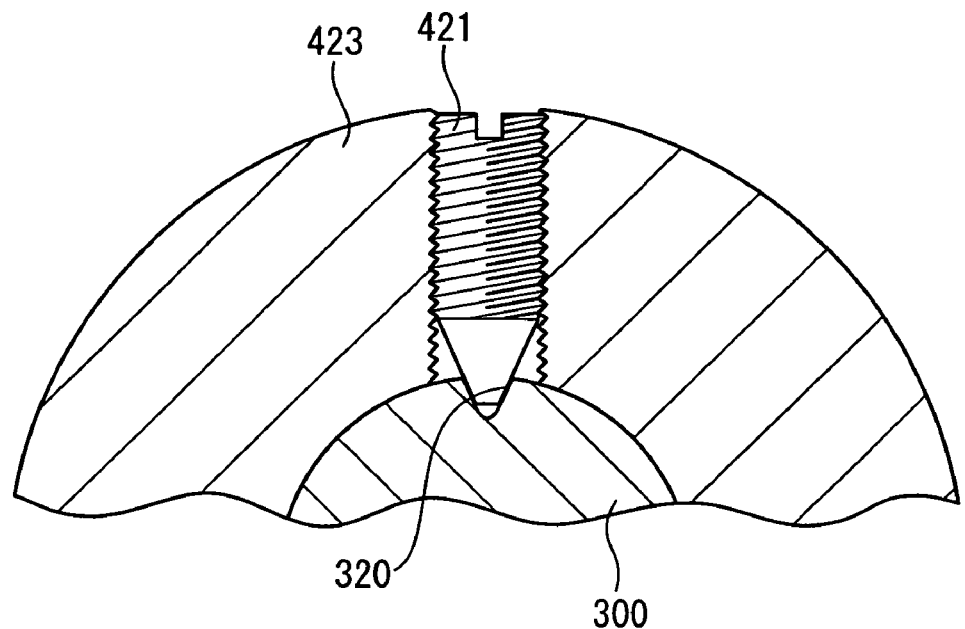
FIG. 7 is an illustration showing a first modification.

As shown in FIG. 7, in the modification 1, the engaging pin 421 is screwed into the rotor bushing 423. The tip end of the engaging pin 421 shows a tapered shape of a triangle in a side view.

Figure 8:
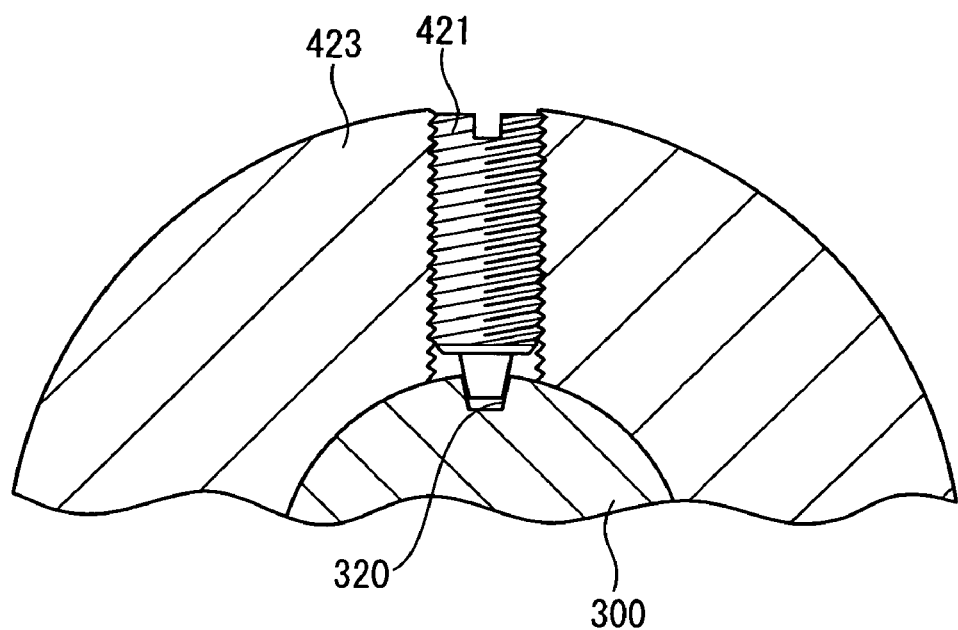
FIG. 8 is an illustration showing a second modification.

As shown in FIG. 8, in the modification 2, the engaging pin 421 is screwed into the rotor bushing 423. The tip end of the engaging pin 421 shows a shape of a truncated cone. Further, as shown in the cross section of FIG. 8, the engaging groove 320 of the spindle 300 has two side walls respectively erected from two ends of a bottom surface thereof.

Incidentally, in the modifications 1 and 2, the engaging pin 421 is screwed into the rotor bushing 423, whereby the engaging pin supporter 450 is constituted.

Figure 9:
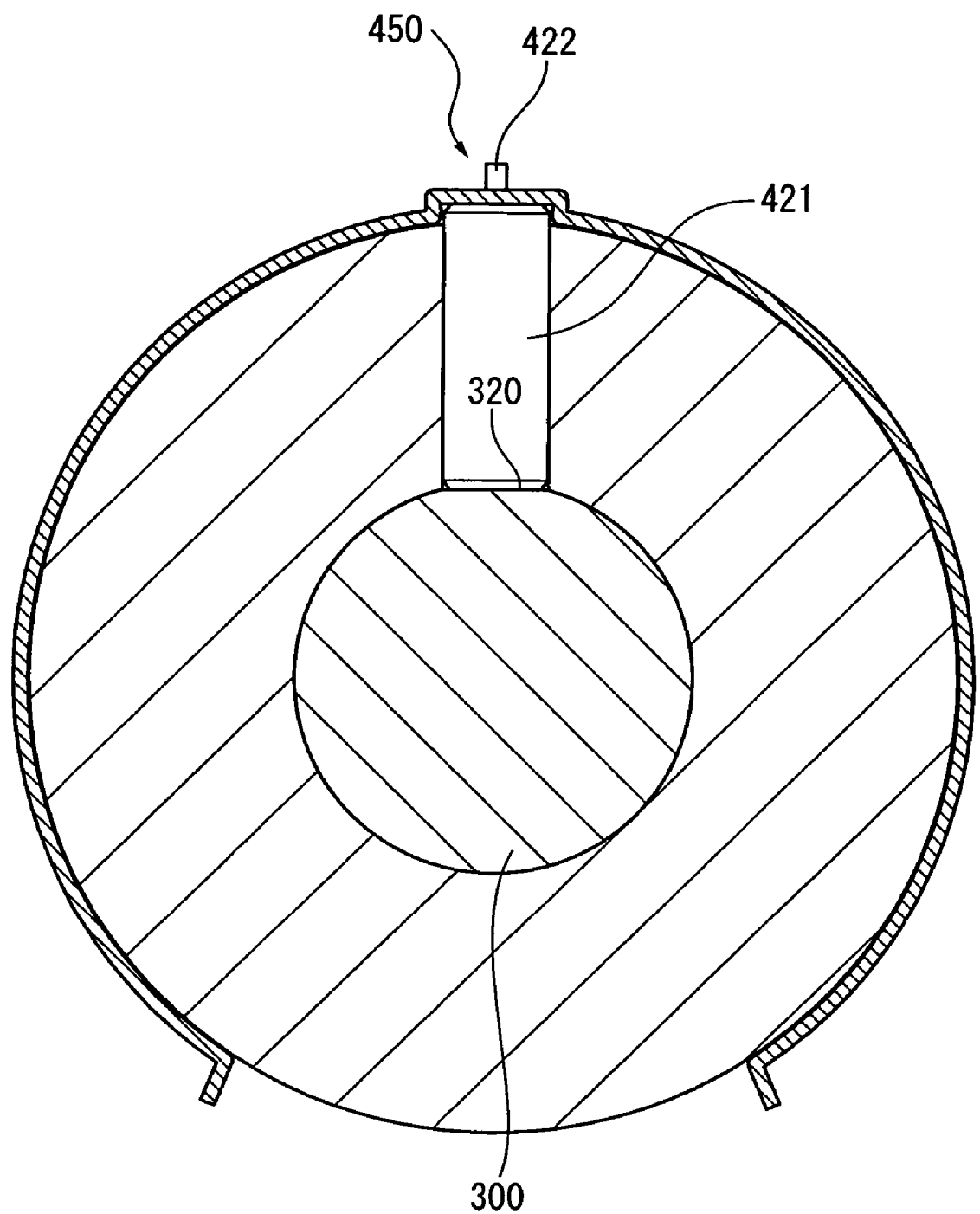
FIG. 9 is an illustration showing a third modification.

As shown in FIG. 9, in the modification 3, the tip end of the engaging pin 421 is a flat surface, and the engaging groove 320 of the spindle 300 is a flat surface too.

Similar to the first embodiment, the ringed leaf spring 441, which constitutes the preloading unit 440, is fitted on the outer surface of the rotor bushing 423.

Figure 10:
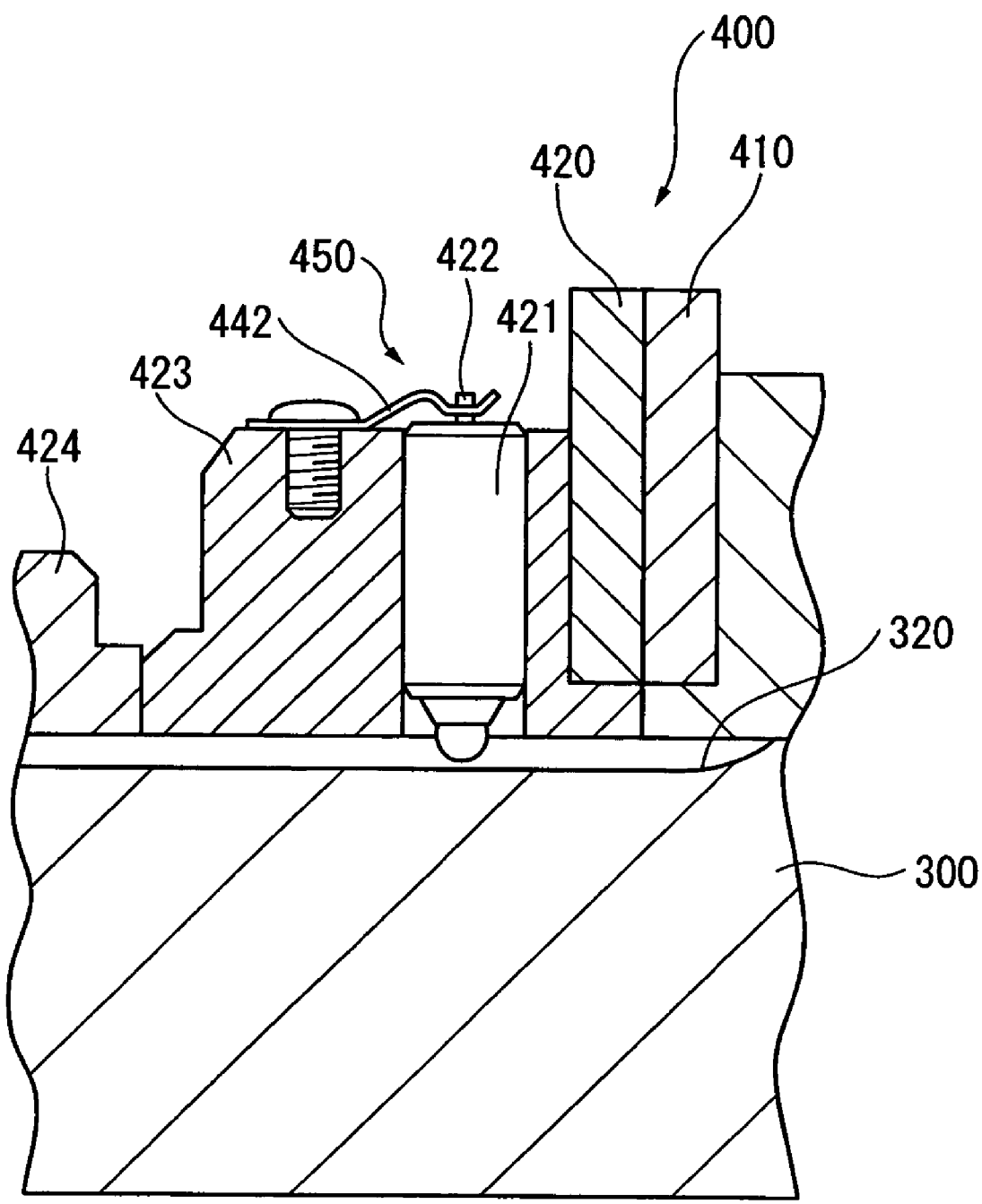
FIG. 10 is an illustration showing a fourth modification.
Figure 11A:
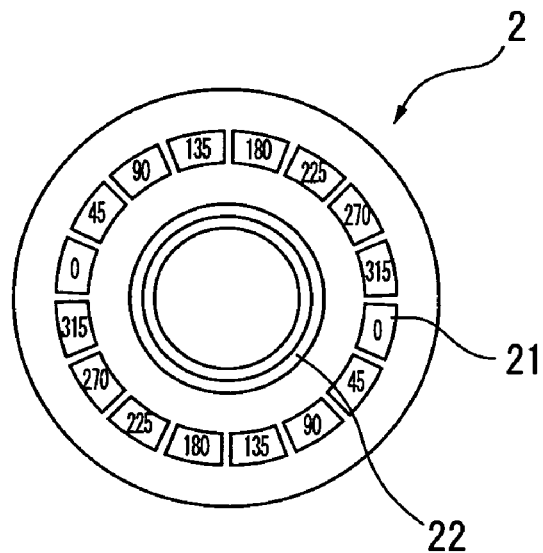
FIG. 11A and FIG. 11B are illustrations respectively showing a stator and a rotor of a conventional electrostatic capacitance type rotary encoder.
Figure 11B:
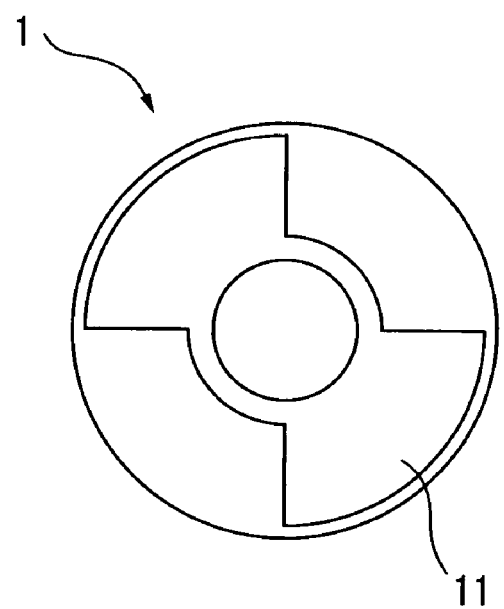

The modification 4 will be described below with reference to FIG. 10.

The modification 4 has the same basic structure as the first embodiment but differs from the first embodiment in that the preloading unit 440 is constituted by a leaf spring 442 that has one end fixed on the rotor bushing 423 and the other end forcing the engaging pin 421 toward the engaging groove 320. The small pin 422 provided on the base end side of the engaging pin 421 is locked by the leaf spring 442, whereby the engaging pin supporter 450 is constituted.

It is to be understood that the present invention is not limited to the embodiments described above, and various modifications and improvements can be made as long as the objects of the present invention can be achieved.

Although the present invention is described using an example in which the lead screw of a spindle is a high lead screw having a pitch of 1 to 2 mm, the lead screw of a spindle also can be multiple thread screw.

The phase signal transmitter is not limited to the configuration described above, but can be other as long as it can perform absolute detection of the rotation angle within one rotation of the spindle.

The phase signal transmitter should be able to detect the rotation angle of the rotor at a predetermined sampling pitch so that the rotation number of the rotor will not be skip-read by the rotation number calculator. For instance, the phase signal transmitter may be such that it can detect the rotation angle of the rotor three or more times for each rotation of the spindle when the spindle is rotated at an available highest rotational speed by manual operation.

It is preferred that the rotation number is stored by the rotation number calculator when the power of the measuring instrument is turned off, so that when the power of the measuring instrument is turned on again, the absolute position of the spindle can be calculated continuously without returning the spindle to the reference position at which the rotation number is zero.

Examples of measuring instrument of the present invention are not intended to be limited to a micrometer, but include others as long as the measuring instrument is such that its spindle, as a movable member, moves back and forth in axial direction while being rotated, such as a micrometer head, etc.

The priority application Number JP2005-213298 upon which this patent application is based is hereby incorporated by reference.

What is claimed is:

1. A measuring instrument comprising:
a main body;
a spindle screwed into the main body and advanceable/retreatable in an axial direction in accordance with its rotation;
a phase signal transmitter that transmits a phase signal in accordance with the rotation of the spindle, the phase signal differing corresponding to a rotation angle of the spindle; and
an arithmetic processor that arithmetically processes the phase signal to obtain an absolute position of the spindle,
wherein the phase signal transmitter transmits the phase signal at a predetermined pitch, and
wherein the arithmetic processor further comprises:
a rotation angle calculator that calculates the rotation angle of the spindle based on the phase signal;
a rotation number calculator that counts the rotation number of the spindle based on the rotation angle of the spindle calculated by the rotation angle calculator;
a total rotational phase calculator that calculates a total rotational phase of the spindle based on the rotation number of the spindle counted by the rotation number calculator and the rotation angle of the spindle calculated by the rotation angle calculator; and
a spindle position calculator that calculates the absolute position of the spindle based on the total rotational phase of the spindle calculated by the total rotational phase calculator,
wherein the phase signal transmitter comprises a single rotor that rotates integrally with the spindle and includes a rotating surface perpendicular to the axial direction of the spindle, and a single stator provided on the main body and including a rotation-detecting surface for detecting the rotation of the rotor opposing to the rotor, the stator transmitting the phase signal corresponding to a rotation angle of the rotor,
the stator further comprises two detecting tracks for detecting the rotation of the rotor on the rotation-detecting surface and transmitting signals different from each other, the two tracks being a first track that transmits a first phase signal and a second track that transmits a second phase signal varying at a period different from that of the first phase signal,
phase difference between the first phase signal and the second phase signal differs corresponding to the rotation angle of the rotor, and
the rotation angle calculator calculates the rotation angle of the rotor based on the phase difference.

2. The measuring instrument according to claim 1, wherein
the stator comprises transmitting terminals to which an AC signal is applied, and receiving terminals respectively having a predetermined number of detecting patterns corresponding to phase variation within one period, and
the rotor comprises coupled terminals electromagnetically coupled with the transmitting terminals and the receiving terminals, the coupled terminals having detecting patterns whose number corresponds to that of respective receiving terminals.

3. The measuring instrument according to claim 1, wherein
the spindle is displaced by 1 mm or more per one rotation.

4. The measuring instrument according to claim 1, wherein
the spindle is provided with an engaging portion along the axial direction thereof; and
the phase signal transmitter is provided with an engaging pin arranged on the rotor and engaged with the engaging portion, and a preloading unit that preloads the engaging pin toward the engaging portion.

5. The measuring instrument according to claim 4, wherein
   the engaging pin is slidable relative to the rotor in a direction perpendicular to the axial direction of the spindle, and
   the preloading unit comprises a leaf spring attached on the rotor, the leaf spring biasing the engaging pin toward the engaging portion.

6. The measuring instrument according to claim 4, wherein
   the phase signal transmitter is provided with an engaging pin supporter which prevents the engaging pin from escaping from the rotor.

7. The measuring instrument according to claim 3, wherein
   the main body comprises a spindle operation section for manually rotating the spindle,
   the spindle operation section further comprises:

a cap tube rotatably arranged on an outer surface of the main body; and a constant-pressure mechanism arranged between the cap tube and the spindle, the constant-pressure mechanism operating in a manner that, when a load acting between the cap tube and the spindle is lower than a predetermined value, the constant-pressure mechanism transmits the rotation of the cap tube to the spindle; and when the load is equal to or higher than the predetermined value, the constant-pressure mechanism runs idle between the cap tube and the spindle.

* * * * *